UNITED STATES PATENT OFFICE.

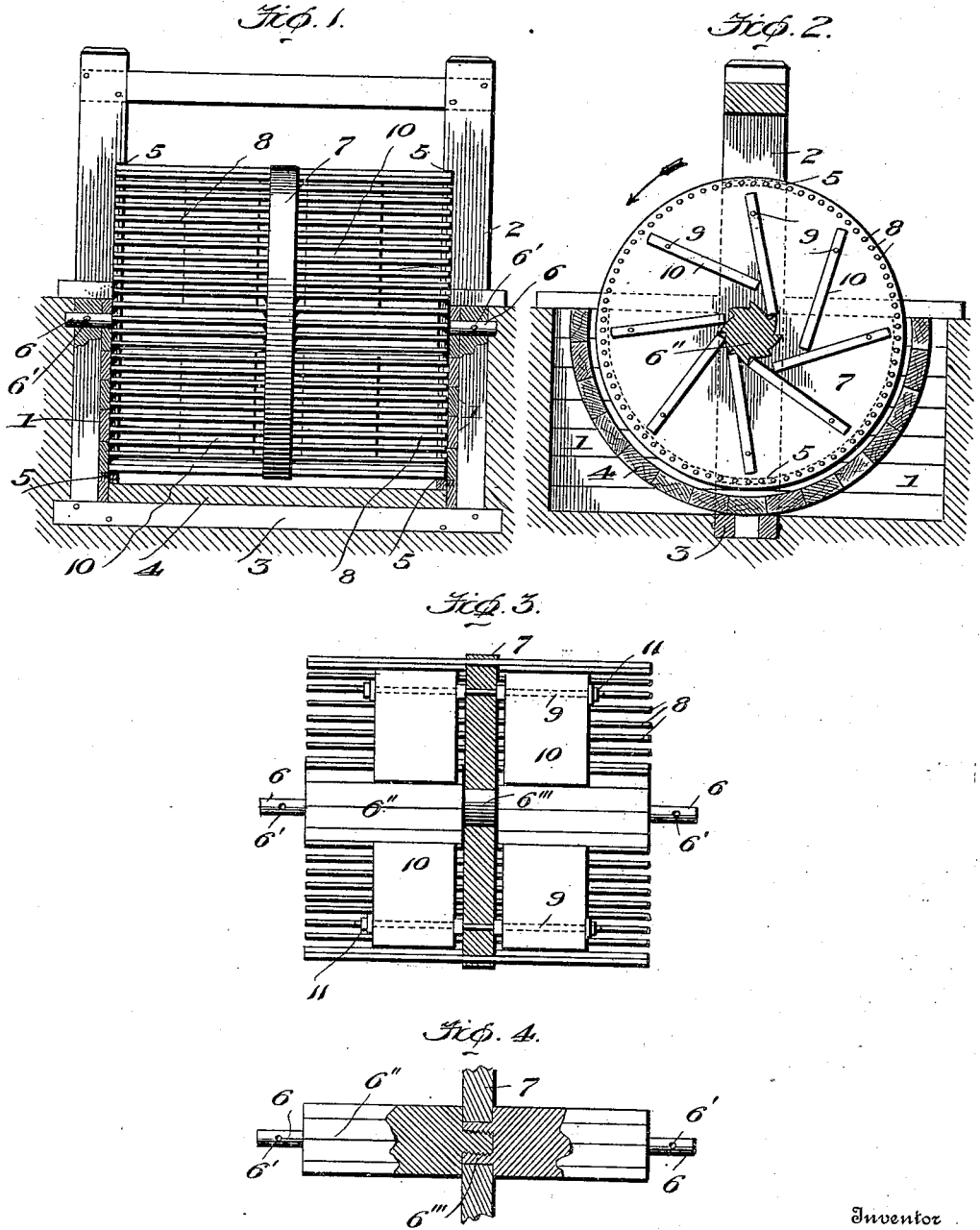

ELSIE H. GRANT, OF AMETHYST, COLORADO, ADMINISTRATRIX OF JOHN R. GRANT, DECEASED.

FISH-SCREEN.

No. 886,797.   Specification of Letters Patent.   Patented May 5, 1908.

Application filed March 26, 1907. Serial No. 364,564.

*To all whom it may concern:*

Be it known that JOHN R. GRANT, deceased, late a citizen of the United States, residing at Amethyst post-office, Creede, county of Mineral, and State of Colorado, did invent a new and useful Fish-Screen, of which the following is a specification.

This invention relates to fish screens.

The object of the present invention is the provision of a fish screen, of the class adapted for use in hatcheries, but also adapted for use in irrigating ditches and laterals and in any small stream or ditch, which will prevent the fish from passing through the screen and dying when the supply of water is cut off.

The invention contemplates the provision of a fish screen of novel construction which will be rotated by the flow of the water, will have means to prevent backward rotation, and will be simple and inexpensive in construction, durable, and so arranged as to prevent the passage of the fish or of any object floating on the surface of the water.

The present rotary fish screen is adapted to turn on a horizontal axis, or it may be arranged with its axis vertically and can be used as an overshot or an undershot screen.

In the accompanying drawings: Figure 1 is a front view; Fig. 2, a vertical section taken at the side of the disk or wheel; Fig. 3, a horizontal section through the disk or wheel, showing the arrangement of the paddles; and Fig. 4, a detail of the ratchet wheel and bearing for the disk or wheel.

As shown in the drawings, the wheel is immersed in the sluice so that the water strikes the paddles when they are uppermost, rotating the wheel in the direction of the arrow.

The wheel-pit may be of cement or planking, the latter being shown in the drawings. The pit has the side planks 1 fastened to the upright framework 2, which is sunk in the ground, and a cross-piece 3 below the pit, connects the parts of the framework 2.

The breast of the wheel is shown at 4, being composed of planks connected to the side planking 1. The side planks 1 and the framework 2 are provided with circular grooves 5. The shaft 6 of the wheel has its ends rigidly secured or fastened, so said shaft cannot turn in the planking 1 and framework 2, as shown at 6', the central part of the shaft being enlarged and made in the form of an elongated ratchet wheel 6''.

The screen comprises a solid disk or wheel 7 which turns in the reduced part 6''' of the ratchet wheel, thus preventing endwise movement of the wheel 7.

The numeral 8 designates a large number of rods of equal length, which pass through and are secured in transverse holes in the wheel 7 near the periphery thereof, said rods being parallel and set very close together, but being sufficiently separated to permit free passage of the water. The ends of the rods on either side of the wheel or screen, are received in the circular grooves 5, thus making a joint past which no object can travel, and also assisting in guiding the screen in its rotation.

Extending laterally through the wheel 7, inwardly from the circle of the rods 8, and secured to said wheel, are a plurality of rods 9 on which paddles 10 are loosely mounted and are held against displacement by nuts 11. As many of these paddles can be employed as found desirable, and they are of such length that their free inner ends are adapted to bear on the parts of the ratchet wheel 6''.

The screen rotates in the direction of the arrow and the water, striking against the loosely swinging paddles, causes rotation of the wheel without interrupting the passage of the water, but on account of the close proximity of the rods 8 to each other, no floating object or fish can pass through the screen. When the paddles assume positions under the axis of the wheel, they take onto the ratchet wheel and thus are prevented from falling out of position and eventually come to their uppermost position where the water is free to strike them and cause continuance of rotation of the screen.

Having thus described the invention, what is claimed as new and desired to be secured by Letters Patent, is:—

1. A rotary fish screen having a screen body whose lateral edges are free, and a screen pit flanked by arc-shaped guides which receive the free lateral edges of the screen body.

2. A rotary fish screen having a screen body, pivoted paddles within the screen body and having their inner ends free, and a ratcheted abutment located within the screen whose teeth the free ends of the paddles are adapted to engage.

3. A rotary fish screen having a screen body and pivoted swinging paddles located inside of said screen body.

4. A rotary fish screen having a screen body, pivoted paddles within the screen body and having their inner ends free, and an abutment for the free ends of the paddles to bear against.

5. A rotary fish screen composed of a rotatory support, and a relatively large number of rods secured to said rotatory support and disposed transversely thereof in close association with each other.

6. A rotary fish screen composed of a rotatory support, a relatively large number of rods secured to said rotatory support and disposed transversely thereof in close association with each other, and a pit flanked by arc-shaped guides which receive the extremities of the rods aforesaid.

In testimony whereof, I hereunto affix my signature in presence of two witnesses.

ELSIE H. GRANT,
*Administratrix of the Estate of John R. Grant, deceased.*

Witnesses:
 F. S. JONES,
 T. P. EDENS.